(12) United States Patent
Chen et al.

(10) Patent No.: US 12,192,511 B2
(45) Date of Patent: Jan. 7, 2025

(54) METHODS AND APPARATUSES FOR SIGNALING OF SYNTAX ELEMENTS IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 90 days.

(21) Appl. No.: 17/956,711

(22) Filed: Sep. 29, 2022

(65) Prior Publication Data
US 2023/0031699 A1    Feb. 2, 2023

Related U.S. Application Data

(63) Continuation of application No. PCT/US2021/023727, filed on Mar. 23, 2021.
(Continued)

(51) Int. Cl.
*H04N 19/105* (2014.01)
*H04N 19/159* (2014.01)
(Continued)

(52) U.S. Cl.
CPC ......... *H04N 19/521* (2014.11); *H04N 19/105* (2014.11); *H04N 19/159* (2014.11);
(Continued)

(58) Field of Classification Search
CPC ........................... H04N 19/521; H04N 19/105
See application file for complete search history.

(56) References Cited

U.S. PATENT DOCUMENTS

| 8,254,455 B2 * | 8/2012 | Wu ........................ H04N 19/89 |
| --- | --- | --- |
| | | 375/240.16 |
| 10,931,945 B2 * | 2/2021 | Francois .............. H04N 19/463 |
| | | (Continued) |

FOREIGN PATENT DOCUMENTS

| CN | 110868613 A | 3/2020 |
| --- | --- | --- |
| CN | 110944172 A | 3/2020 |
| | (Continued) | |

OTHER PUBLICATIONS

International Search Report of International Application No. PCT Application No. PCT/US2021/023727 dated Jul. 7, 2021, (3p).
(Continued)

*Primary Examiner* — Irfan Habib
(74) *Attorney, Agent, or Firm* — Arch & Lake LLP; Hao Tan; Zhangyuan Ji

(57) ABSTRACT

Methods and apparatuses for video coding are provided. The method includes that a decoder determines whether one or more reference picture lists are signaled in a picture header (PH) associated with a picture and whether the one or more reference picture lists indicate that one or more slices associated with the picture are bi-predictive. The method further includes that the decoder adds one or more constraints to one or more syntax elements in the PH in response to determining that the one or more reference picture lists are signaled in the PH and the one or more reference picture lists indicate that the one or more slices are not bi-predictive.

15 Claims, 5 Drawing Sheets

--- using an enabled flag to specify whether one or more temporal motion vector predictors can be used for inter prediction for the one or more slices associated with the a picture head (PH) of a picture
702 constraining value of the enabled flag according to a plurality of offsets applied to a size of the picture for scaling ratio calculation
704

Related U.S. Application Data

(60) Provisional application No. 63/003,226, filed on Mar. 31, 2020.

(51) Int. Cl.
   H04N 19/174 (2014.01)
   H04N 19/513 (2014.01)
   H04N 19/573 (2014.01)
   H04N 19/577 (2014.01)
   H04N 19/70 (2014.01)

(52) U.S. Cl.
   CPC ......... H04N 19/174 (2014.11); H04N 19/573 (2014.11); H04N 19/577 (2014.11); H04N 19/70 (2014.11)

(56) References Cited

U.S. PATENT DOCUMENTS

| | | | | |
|---|---|---|---|---|
| 11,496,771 | B2* | 11/2022 | Seregin | H04N 19/70 |
| 11,533,472 | B2* | 12/2022 | Chen | H04N 19/58 |
| 2013/0268621 | A1* | 10/2013 | Mese | H04N 19/17 709/217 |
| 2013/0272375 | A1* | 10/2013 | Yu | H04N 19/52 375/240.02 |
| 2013/0336407 | A1* | 12/2013 | Chen | H04N 19/513 375/240.16 |
| 2014/0086324 | A1* | 3/2014 | Ramasubramonian | H04N 19/70 375/240.13 |
| 2016/0330255 | A1* | 11/2016 | Denoual | H04N 19/115 |
| 2017/0302951 | A1 | 10/2017 | Laxman et al. | |
| 2021/0195179 | A1* | 6/2021 | Coban | H04N 19/186 |
| 2021/0266600 | A1* | 8/2021 | Seregin | H04N 19/503 |
| 2021/0274215 | A1* | 9/2021 | Kang | H04N 19/52 |
| 2021/0314624 | A1* | 10/2021 | Coban | H04N 19/174 |
| 2021/0368208 | A1* | 11/2021 | Samuelsson | H04N 19/70 |
| 2022/0053207 | A1 | 2/2022 | Deshpande | |
| 2023/0026475 | A1* | 1/2023 | Deshpande | H04N 19/172 |
| 2023/0040224 | A1* | 2/2023 | Chen | H04N 19/174 |
| 2023/0115242 | A1* | 4/2023 | Laroche | H04N 19/156 375/240.02 |
| 2023/0353749 | A1* | 11/2023 | Nam | H04N 19/174 |
| 2024/0137546 | A1* | 4/2024 | Kuo | H04N 19/44 |

FOREIGN PATENT DOCUMENTS

| | | |
|---|---|---|
| WO | 2014104242 A1 | 7/2014 |
| WO | 2019147628 A1 | 8/2019 |
| WO | 2019192301 A1 | 10/2019 |
| WO | 2019194435 A1 | 10/2019 |
| WO | 2021201759 A1 | 10/2021 |

OTHER PUBLICATIONS

Bross, Benjamin et al., "Versatile Video Coding (Draft 8)", JVET-Q2001-vE, Joint Video Experts Team (JVET) of ITU-T SG 16 WP 3 and ISO/IEC JTC 1/SC 29/WG 11 17th Meeting: Brussels, (512p).
Wan, Wade et al., "AHG8: RPR Scaling Window Issues", Joint Video Experts Team (JVET) of ITU-T SG 16 WP 3 and ISO/IEC JTC 1/SC 29/WG 11, JVET-Q0487-v2, 17th Meeting: Brussels, BE Jan. 7-17, 2020, (6p).
Hendry et al., "[AHG9]: on signalling of TMVP enabled flag and collocated reference picture", Joint Video Experts Team (JVET) of ITU-T SG 16 WP 3 and ISO/IEC JTC 1/SC 29/WG 11, JVET-Q0207, 17th Meeting: Brussels, BE Jan. 7-17, 2020, (7p).
Sun, Yucheng et al., Non-CE4: Constraints on block size for ATMVP, Joint Video Experts Team (JVET) of ITU-T SG 16 WP 3 and ISO/IEC JTC 1/SC 29/WG 11, 17th Meeting: Brussels, BE, Jan. 7-17, 2020, (2p).
Benjamin Bross et al., "Versatile Video Coding (Draft 8)", Joint Video Experts Team (JVET) of ITU-T SG 16 WP 3 and ISO/IEC JTC 1/SC 29/WG 11,JVET-Q2001-vED, 17th Meeting: Brussels, BE, Jan. 7-17, 2020,(512p).
MediaTek Inc, Shih-Ta Hsiang et al., "AHG9: Overhead reduction for picture header and slice header" Joint Video Experts Team (JVET) of ITU-T SG 16 WP 3 and ISO/IEC JTC 1/SC 29/WG 11, JVET-R0052-v1, 18th Meeting: by teleconference, Apr. 15-24, 2020, (13p).
Bytedance Inc, Li Zhang, et al., "AHG9: On allowed slice types in a picture", Joint Video Experts Team (JVET) of ITU-T SG 16 WP 3 and ISO/IEC JTC 1/SC 29/WG 11, JVET-R0061-v1, 18th Meeting: by teleconference, Apr. 15-24, 2020,(8p).
Sharp Corporation., Takeshi Chujoh et al., Joint Video Experts Team (JVET) of ITU-T SG 16 WP 3 and ISO/IEC JTC 1/SC 29/WG 11, JVET-R0137-v14. 18th Meeting: by teleconference, Apr. 15-24, 2020, (8p).
Ericsson, Martin Pettersson et al., "AHG9: On B-slice signaling in the PH and derivation of slice_type", oint Video Experts Team (JVET) of ITU-T SG 16 WP 3 and ISO/IEC JTC 1/SC 29/WG 11,JVET-R0250, 18th Meeting: by teleconference, Apr. 15-24, 2020, (5p).
Kwai Inc., Yi-Wen Chen et al., "AHG9: On syntax signaling conditions in picture header", oint Video Experts Team (JVET) of ITU-T SG 16 WP 3 and ISO/IEC JTC 1/SC 29/WG 11,JVET-R0324, 18th Meeting: by teleconference, Apr. 15-24, 2020, (5p).
S-T Hsiang et al: "AHG9: Overhead reduction for picture header", 17. JVET Meeting; Jan. 7, 2020-Jan. 17, 2020; Brussels; (The Joint Video Exploration Team of ISO/IEC JTC1/SC29/WG11 and ITU-T SG.16) No. JVET-Q0176 ;m51765 Jan. 9, 2020(Jan. 9, 2020), XP030222797, Retrieved from the Internet: URL:http://phenix.int-evry.fr/jvet/doc end user/documents/17 Brussels/wg11/JVET-Q017 6-v4.zip JVET-Q0176-v4.docx [retrieved on Jan. 9, 2020],(12p).
Y-W Chen(Kwai)et al: "AHG9:On syntax signalling conditions in picture header", 130. MPEG Meeting; Apr. 20, 2020-Apr. 24, 2020; Alpbach;; (Motion Picture Expert Group or ISO/IEC JTC1/SC29/WG11) No. m53308; JVET-R0324 Apr. 16, 2020(Apr. 16, 2020),XP030286514, Retrieved from the Internet: URL: http://phenix.int-evry.fr/mpeg/docend user/documents/130 Alpbach/wg11/m53308-JVET-R0324-v5-JEVE-R0324 r4.zip JVET-R0324 r4.docx [retrieved on Apr. 16, 2020], (6p).
Y-K Wang(Bytedance) et al: "AHG9:A summary of proposals on PH and SH syntax", 130.MPEG Meeting; Apr. 20, 2020-Apr. 24, 2020; Alpbach; (Motion Picture Expert Group or ISO JTC1/SC29/WG11) No. m53763 ; JVET-R0410 Apr. 15, 2020(Apr. 15, 2020), XP030287515, Retrieved from the Internet: URL:http://phenix.int-evry.fr/mpeg/doc end user/documents/130 Alpbach/wg11/m53763-JV ET-R0410-v4-JVET-R0410-v4.zip JVET-R0410-v4.docx [retrieved on Apr. 15, 2020],(8p).
Benjamin Bross et al: "Versatile Video Coding(Draft 7)", 16. JVET Meeting; Oct. 1, 2019-Oct. 11, 2019; Geneva; (The Joint Video Exploration Team of ISO/IEC JTC1/SC29/WG11 and ITU-T SG.16) No. JVET-P2001-vE; JVET-P2001 ; m51515 Nov. 14, 2019(Nov. 14, 2019), pp. 1-489,XP030224330, Retrieved from the Internet: URL:http://phenix.int-evry.fr/jvet/doc end user/documents/16 Geneva/wg11/JVET-P2001-v14.zip JVET-P2001-vE.docx [retrieved on Nov. 14, 2019], (4p).
Esenlik(Huawei) S et al: "AHG9: Slice Level control of coding tools", 17. JVET Meeting; Jan. 7, 2020-Jan. 17, 2020; Brussels; (The Joint Video Exploration Team of ISO/IEC JTC1/SC29/WG11 and ITU-T SG.16) No. JVET-Q0360;m51955 Dec. 31, 2019 (Dec. 31, 2019), XP030223312, Retrieved from the Internet: URL:http://phenix.int-evry.fr/jvet/doc end user/documents/17 Brussels/wg11/JVET-Q036 0-v1.zip JVET-Q0360.docx [retrieved on Dec. 31, 2019], (p).
Office Action issued to Korean Application No. 2023-052605144 dated Jun. 9, 2023 with English translation, (9p).
Bross, Benjamin, et al. "Versatile Video Coding (Draft 8)", Joint Video Experts Team (JVET) of ITU-T SG 16 WP 3 and ISO/IEC JTC 1/SC 29/WG11, JVET-Q2001-v14, 17th Meeting Brussels, Feb. 2020, (80p).

\* cited by examiner

SPLIT_BT_VER

SPLIT_BT_HOR

SPLIT_TT_VER

SPLIT_TT_HOR determining whether one or more reference picture lists are signaled in a picture header (PH) associated with a picture and whether the one or more reference picture lists indicate that one or more slices associated with the picture are bi-predictive
602

adding one or more constraints to one or more syntax elements in the PH in response to determining that the one or more reference picture lists are signaled in the PH and the one or more reference picture lists indicate that the one or more slices are not bi-predictive
604

FIG. 6 using an enabled flag to specify whether one or more temporal motion vector predictors can be used for inter prediction for the one or more slices associated with the a picture head (PH) of a picture
702

constraining value of the enabled flag according to a plurality of offsets applied to a size of the picture for scaling ratio calculation
704

FIG. 7

METHODS AND APPARATUSES FOR SIGNALING OF SYNTAX ELEMENTS IN VIDEO CODING

CROSS-REFERENCE TO RELATED APPLICATION

This application is a continuation application of PCT application No. PCT/US2021/023727 filed on Mar. 23, 2021, which is based upon and claims priority to Provisional Application No. 63/003,226 filed on Mar. 31, 2020, the entire disclosures of which are incorporated herein by reference in their entireties for all purposes.

FIELD

The present disclosure relates to video coding and compression, and in particular but not limited to, methods and apparatuses for signaling of syntax elements in video coding.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

SUMMARY

The present disclosure provides examples of techniques relating to signaling of syntax elements in video coding.

According to a first aspect of the present disclosure, there is provided a method for video decoding. The method includes that a decoder determines whether one or more reference picture lists are signaled in a picture header (PH) associated with a picture and determines from the one or more reference picture lists whether one or more slices associated with the picture are bi-predictive. Further, the method includes that the decoder does not parse one or more syntax elements in the PH in response to determining that the one or more reference picture lists are signaled in the PH and determines from the one or more reference picture lists indicate that the one or more slices are not bi-predictive.

According to a second aspect of the present disclosure, there is provided an apparatus for video decoding. The apparatus includes one or more processors and a memory configured to store instructions executable by the one or more processors. The one or more processors, upon execution of the instructions, are configured to determine whether one or more reference picture lists are signaled in a PH associated with a picture and determine from the one or more reference picture lists whether one or more slices associated with the picture are bi-predictive. Further, the one or more processors are configured to not parse one or more syntax elements in the PH in response to determining that the one or more reference picture lists are signaled in the PH and determining from the one or more reference picture lists that the one or more slices are not bi-predictive.

According to a third aspect of the present disclosure, there is provided a non-transitory computer readable storage medium for video coding storing computer-executable instructions. The instructions, when executed by one or more computer processors, causing the one or more computer processors to perform the method for video coding according to the first aspect of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 6 is a flowchart illustrating an exemplary process of video coding in accordance with some implementations of the present disclosure.

FIG. 7 is a flowchart illustrating an exemplary process of video coding in accordance with some implementations of the present disclosure.

DETAILED DESCRIPTION

Figure 1:
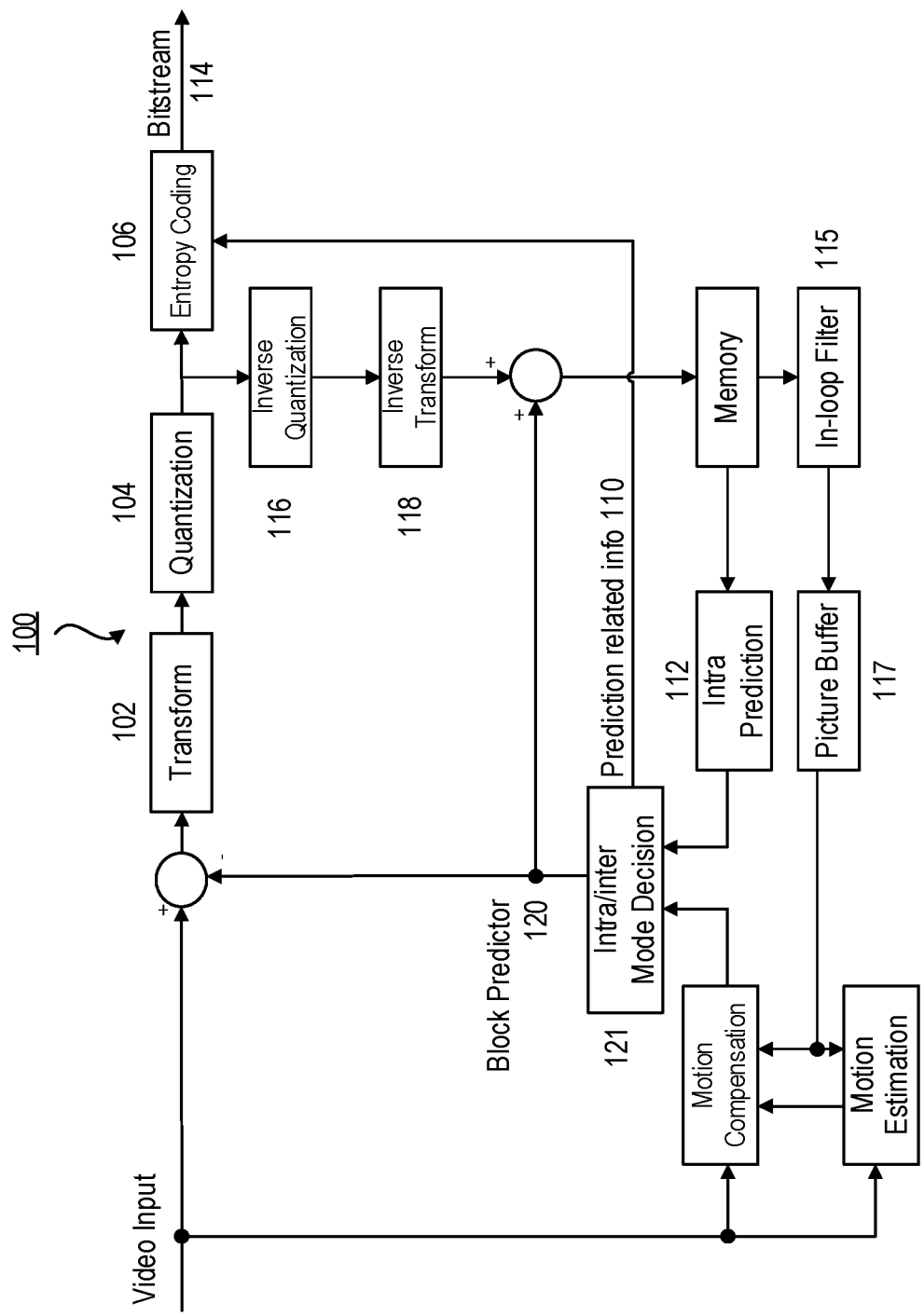
FIG. 1 is a block diagram illustrating an exemplary video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram of illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate unfiltered reconstructed pixels for a current video block.

Intra prediction (also referred to as "spatial prediction") uses pixels from the samples of already coded neighboring blocks (which are called reference samples) in the same video picture and/or slice to predict the current video block. Spatial prediction reduces spatial redundancy inherent in the video signal.

Inter prediction (also referred to as "temporal prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bitstream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
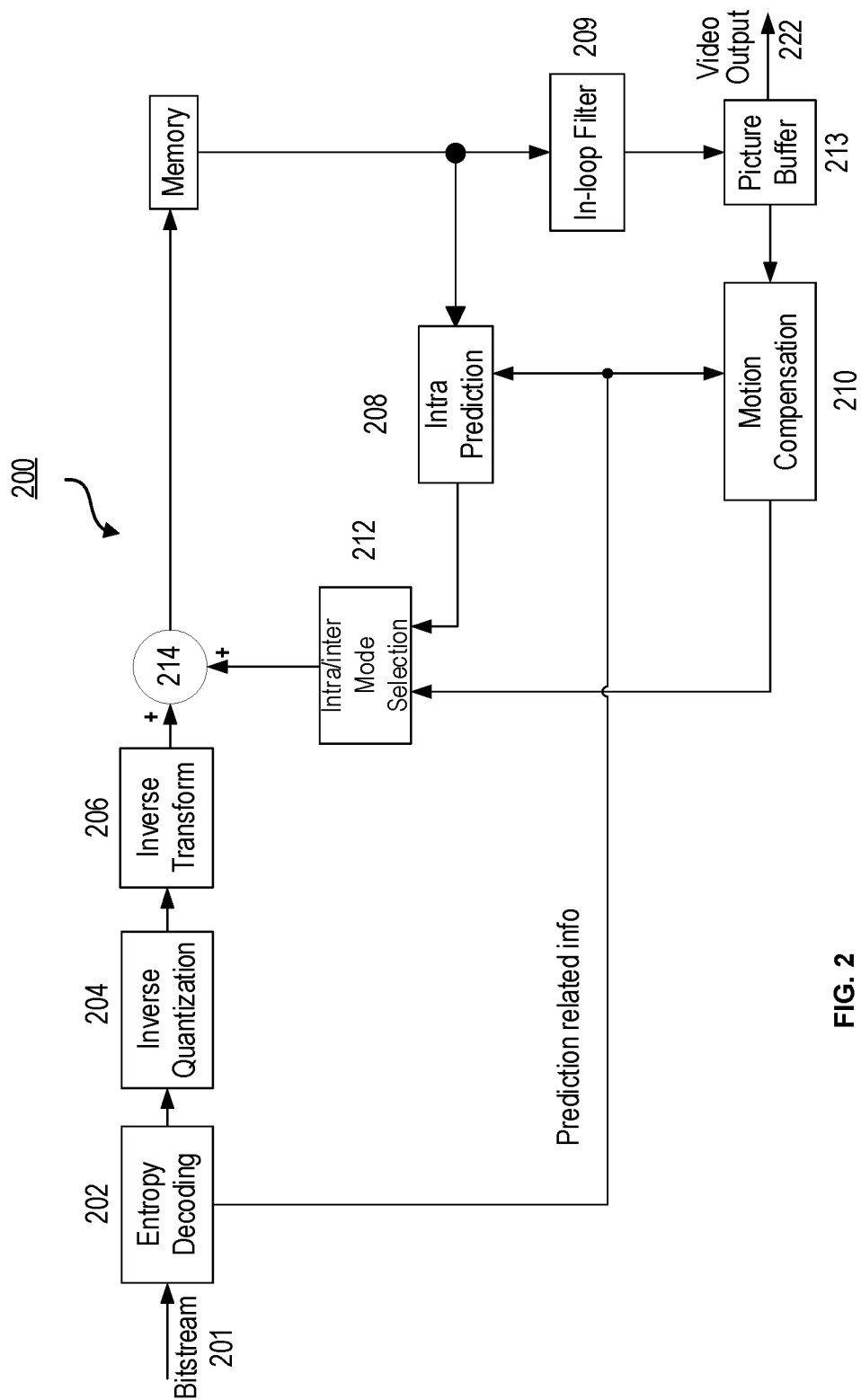
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. Block partitioning schemes in some standards are elaborated below.

High Efficient Video Coding (HEVC)

HEVC is based on a hybrid block-based motion-compensated transform coding architecture. The basic unit for compression is termed CTU. The maximum CTU size is defined as up to 64 by 64 luma pixels, and two blocks of 32 by 32 chroma pixels for 4:2:0 chroma format. Each CTU may contain one CU or recursively split into four smaller CUs until the predefined minimum CU size is reached. Each CU (also named leaf CU) contains one or multiple prediction units (PUs) and a tree of transform units (TUs).

In general, except for monochrome content, a CTU may include one luma coding tree block (CTB) and two corresponding chroma CTBs; a CU may include one luma coding block (CB) and two corresponding chroma CBs; a PU may include one luma prediction block (PB) and two corresponding chroma PBs; and a TU may include one luma transform block (TB) and two corresponding chroma TBs. However, exceptions may occur because the minimum TB size is 4×4 for both luma and chroma (i.e., no 2×2 chroma TB is supported for 4:2:0 color format) and each intra chroma CB always has only one intra chroma PB regardless of the number of intra luma PBs in the corresponding intra luma CB.

For an intra CU, the luma CB may be predicted by one or four luma PBs, and each of the two chroma CBs is always predicted by one chroma PB, where each luma PB has one intra luma prediction mode and the two chroma PBs share one intra chroma prediction mode. Moreover, for the intra CU, the TB size cannot be larger than the PB size. In each PB, the intra prediction is applied to predict samples of each TB inside the PB from neighboring reconstructed samples of the TB. For each PB, in addition to 33 directional intra prediction modes, DC and planar modes are also supported to predict flat regions and gradually varying regions, respectively.

For each inter PU, one of three prediction modes including inter, skip, and merge, may be selected. Generally speaking, a motion vector competition (MVC) scheme is introduced to select a motion candidate from a given candidate set that includes spatial and temporal motion candidates. Multiple references to the motion estimation allow finding the best reference in 2 possible reconstructed reference picture lists (namely List 0 and List 1).

For the inter mode (termed AMVP mode, where AMVP stands for advanced motion vector prediction), inter prediction indicators (List 0, List 1, or bi-directional prediction), reference indices, motion candidate indices, motion vector differences (MVDs) and prediction residual are transmitted. As for the skip mode and the merge mode, only merge indices are transmitted, and the current PU inherits the inter prediction indicator, reference indices, and motion vectors from a neighboring PU referred by the coded merge index. In the case of a skip coded CU, the residual signal is also omitted.

Versatile Video Coding (VVC)

At the 10th JVET meeting, held Apr. 10-20, 2018, San Diego, US, JVET defined the first draft of Versatile Video Coding (VVC) and the VVC Test Model 1 (VTM1) as its reference software implementation. It was decided to include a quadtree with a nested multi-type tree as the initial new coding feature of VVC. The multi-type tree is a coding block partition structure including both binary and ternary split. Since then, the reference software VTM, with both encoding and decoding process implemented, has been developed and updated through the following JVET meetings.

In VVC, a picture of an input video is partitioned into blocks called CTUs. A CTU is split into CUs using a quadtree with a nested multi-type tree structure, with a CU defining a region of pixels sharing the same prediction mode (e.g., intra or inter). The term 'unit' may define a region of an image covering all components such as luma and chroma. The term 'block' may be used to define a region covering a particular component (e.g., luma), and the blocks of different components (e.g., luma vs. chroma) may differ in spatial location when considering the chroma sampling format such as 4:2:0.

Partitioning of the Picture into CTUs

Figure 3:
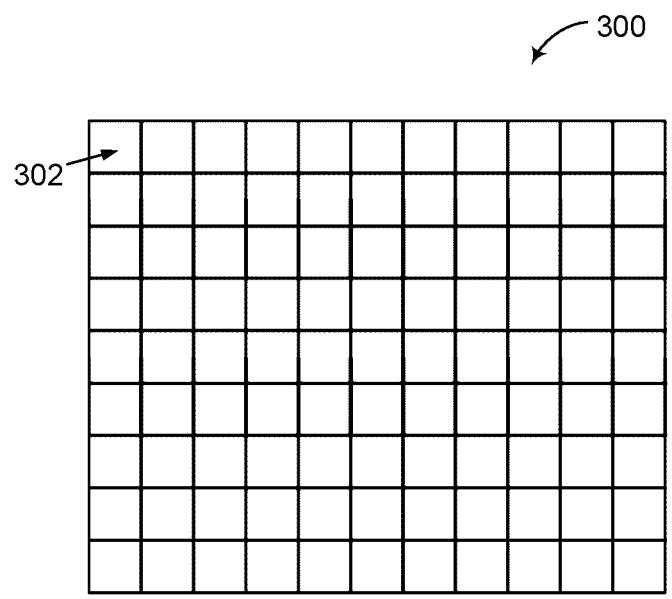
FIG. 3 illustrates an example of a picture divided into multiple coding tree units (CTUs) in accordance with some implementations of the present disclosure.
Figure 4A:
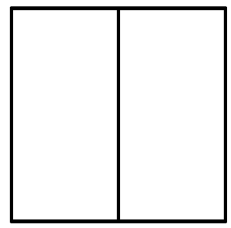
FIGS. 4A-4D are schematic diagrams illustrating multi-type tree splitting modes in accordance with some implementations of the present disclosure.
Figure 4B:
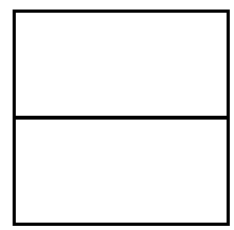
Figure 4C:
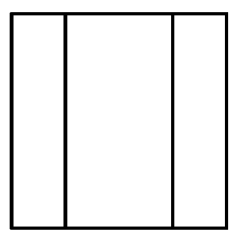
Figure 4D:
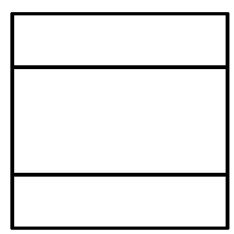

FIG. 3 illustrates an example of a picture 300 divided into multiple CTUs 302 in accordance with some implementations of the present disclosure.

In VCC, pictures are divided into a sequence of CTUs. The CTU concept is same to that of the HEVC. For a picture that has three sample arrays, a CTU consists of an N×N block of luma samples together with two corresponding blocks of chroma samples.

The maximum allowed size of the luma block in a CTU is specified to be 128×128 (although the maximum size of the luma transform blocks is 64×64).

Partitioning of the CTUs Using a Tree Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e., it removes the separation of the CU, PU and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (a.k.a. quadtree) structure. Then the quaternary tree leaf nodes can be further partitioned by a multi-type tree structure.

FIGS. 4A-4D are schematic diagrams illustrating multi-type tree splitting modes in accordance with some implementations of the present disclosure. As shown in FIGS. 4A-4D, there are four splitting types in multi-type tree structure, vertical binary splitting 402 (SPLIT_BT_VER), horizontal binary splitting 404 (SPLIT_BT_HOR), vertical ternary splitting 406 (SPLIT_TT_VER), and horizontal ternary splitting 408 (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quadtree with nested multi-type tree coding block structure. The exception occurs when maximum supported transform length is smaller than the width or height of the colour component of the CU.

Syntax in VVC

In VVC, the first layer of bitstream of syntax signaling is the Network Abstraction Layer (NAL) where the bitstream is divided into a set of NAL units. Some NAL units signal common control parameters to the decoder, such as the Sequence Parameter Sets (SPS) and Picture Parameter Sets (PPS). Others contain video data. The Video Coding Layer (VCL) NAL units contain slices of coded video. A coded picture is called an access unit and can be encoded as one or more slices.

A coded video sequence starts with an Instantaneous Decoder Refresh (IDR) picture. All following video pictures are coded as slices. A new IDR picture signals that the previous video segment is ended, and a new one begins. Each NAL unit begins with a one-byte header followed by the Raw Byte Sequence Payload (RBSP). The RBSP contains encoded slices. Slices are binary coded, so they may be padded with zero bits to ensure that the length is an integer number of bytes. A slice consists of a slice header and slice data. Slice data are specified as a series of CUs.

The picture header concept was adopted in the 16th JVET meeting to be transmitted once per picture as the first VCL NAL unit of a picture. It was also proposed to group some syntax elements previously in the slice header to this picture header. Syntax elements that functionally only need to be transmitted once per picture could be moved to the picture header instead of being transmitted multiple times in slices for a given picture.

In the VVC specification, the syntax tables specify a superset of the syntax of all allowed bitstreams. Additional constraints on the syntax may be specified, either directly or indirectly, in other clauses. Table 1 below is a syntax table of the slice header and picture header in VVC. The semantics of some syntax are also illustrated after the syntax table.

TABLE 1

|  | Descriptor |
| --- | --- |
| slice_header( ) { |  |
|   picture_header_in_slice_header_flag | u(1) |
|   if( picture_header_in_slice_header_flag ) |  |
|     picture_header_structure( ) |  |
|   if( subpic_info_present_flag ) |  |
|     slice_subpic_id | u(v) |
|   if( ( rect_slice_flag && NumSlicesInSubpic[ CurrSubpicIdx ] > 1 ) \|\| |  |
|     ( !rect_slice_flag && NumTilesInPic > 1 ) ) |  |
|     slice_address | u(v) |
|   for( i = 0; i < NumExtraShBits; i++ ) |  |
|     sh_extra_bit[ i ] | u(1) |
|   if( !rect_slice_flag && NumTilesInPic > 1 ) |  |
|     num_tiles_in_slice_minus1 | ue(v) |
|   if( ph_inter_slice_allowed_flag ) |  |
|     slice_type | ue(v) |
|   if( sps_alf_enabled_flag && !alf_info_in_ph_flag ) { |  |
|     slice_alf_enabled_flag | u(1) |
|     if( slice_alf_enabled_flag ) { |  |
|       slice_num_alf_aps_ids_luma | u(3) |
|       for( i = 0; i < slice_num_alf_aps_ids_luma; i++ ) |  |
|         slice_alf_aps_id_luma[ i ] | u(3) |
|       if( ChromaArrayType != 0 ) |  |
|         slice_alf_chroma_idc | u(2) |
|       if( slice_alf_chroma_idc ) |  |
|         slice_alf_aps_id_chroma | u(3) |
|       if( sps_ccalf_enabled_flag ) { |  |
|         slice_cc_alf_cb_enabled_flag | u(1) |
|         if( slice_cc_alf_cb_enabled_flag ) |  |
|           slice_cc_alf_cb_aps_id | u(3) |
|         slice_cc_alf_cr_enabled_flag | u(1) |
|         if( slice_cc_alf_cr_enabled_flag ) |  |
|           slice_cc_alf_cr_aps_id | u(3) |
|       } |  |
|     } |  |
|   } |  |
|   if( separate_colour_plane_flag == 1 ) |  |
|     colour_plane_id | u(2) |
|   if( !rpl_info_in_ph_flag && ( ( nal_unit_type != IDR_W_RADL && |  |
| nal_unit_type != |  |
|     IDR_N_LP ) \|\| sps_idr_rpl_present_flag ) ) |  |

TABLE 1-continued

```
    ref_pic_lists( )
    if( ( rpl_info_in_ph_flag || ( ( nal_unit_type != IDR_W_RADL &&
nal_unit_type !=
        IDR_N_LP ) || sps_idr_rpl_present_flag ) ) &&
        ( ( slice_type != I && num_ref_entries[ 0 ][ RplsIdx[ 0 ] ] > 1 ) ||
        ( slice_type = = B && num_ref_entries[ 1 ][ RplsIdx[ 1 ] ] > 1 ) ) ) {
        num_ref_idx_active_override_flag                                     u(1)
        if( num_ref_idx_active_override_flag )
            for( i = 0; i < ( slice_type = = B ? 2: 1 ); i++ )
                if( num_ref_entries[ i ][ RplsIdx[ i ] ] > 1 )
                    num_ref_idx_active_minus1[ i ]                           ue(v)
    }
    if( slice_type != I ) {
        if( cabac_init_present_flag )
            cabac_init_flag                                                  u(1)
        if( ph_temporal_mvp_enabled_flag && !rpl_info_in_ph_flag ) {
            if( slice_type = = B )
                slice_collocated_from_l0_flag                                u(1)
            if( ( slice_collocated_from_l0_flag && NumRefIdxActive[ 0 ] > 1 ) ||
                ( ! slice_collocated_from_l0_flag && NumRefIdxActive[ 1 ] > 1 ) )
                slice_collocated_ref_idx                                     ue(v)
        }
        if( !wp_info_in_ph_flag && ( ( pps_weighted_pred_flag && slice_type = = P
) ||
            ( pps_weighted_bipred_flag && slice_type = = B ) ) )
            pred_weight_table( )
    }
    if( !qp_delta_info_in_ph_flag )
        slice_qp_delta                                                       se(v)
    if( pps_slice_chroma_qp_offsets_present_flag ) {
        slice_cb_qp_offset                                                   se(v)
        slice_cr_qp_offset                                                   se(v)
        if( sps_joint_cbcr_enabled_flag )
            slice_joint_cbcr_qp_offset                                       se(v)
    }
    if( pps_cu_chroma_qp_offset_list_enabled_flag )
        cu_chroma_qp_offset_enabled_flag                                     u(1)
    if( sps_sao_enabled_flag && !sao_info_in_ph_flag ) {
        slice_sao_luma_flag                                                  u(1)
        if( ChromaArrayType != 0 )
            slice_sao_chroma_flag                                            u(1)
    }
    if( deblocking_filter_override_enabled_flag && !dbf_info_in_ph_flag )
        slice_deblocking_filter_override_flag                                u(1)
    if( slice_deblocking_filter_override_flag ) {
        slice_deblocking_filter_disabled_flag                                u(1)
        if( !slice_deblocking_filter_disabled_flag ) {
            slice_beta_offset_div2                                           se(v)
            slice_tc_offset_div2                                             se(v)
            slice_cb_beta_offset_div2                                        se(v)
            slice_cb_tc_offset_div2                                          se(v)
            slice_cr_beta_offset_div2                                        se(v)
            slice_cr_tc_offset_div2                                          se(v)
        }
    }
    slice_ts_residual_coding_disabled_flag                                   u(1)
    if( ph_lmcs_enabled_flag )
        slice_lmcs_enabled_flag                                              u(1)
    if( ph_explicit_scaling_list_enabled_flag )
        slice_explicit_scaling_list_used_flag                                u(1)
    if( NumEntryPoints > 0 ) {
        offset_len_minus1                                                    ue(v)
        for( i = 0; i < NumEntryPoints; i++ )
            entry_point_offset_minus1[ i ]                                   u(v)
    }
    if( slice_header_extension_present_flag ) {
        slice_header_extension_length                                        ue(v)
        for( i = 0; i < slice_header_extension_length; i++)
            slice_header_extension_data_byte[ i ]                            u(8)
    }
    byte_alignment( )
}
```

|  | Descriptor |
|---|---|
| ```
picture_header_structure( ) {
    gdr_or_irap_pic_flag
    if( gdr_or_irap_pic_flag )
        gdr_pic_flag
    ph_inter_slice_allowed_flag
``` | u(1)<br><br>u(1)<br>u(1) |

TABLE 1-continued

```
if( ph_inter_slice_allowed_flag )
    ph_intra_slice_allowed_flag                                                u(1)
non_reference_picture_flag                                                     u(1)
ph_pic_parameter_set_id                                                        ue(v)
ph_pic_order_cnt_lsb                                                           u(v)
if( gdr_or_irap_pic_flag )
    no_output_of_prior_pics_flag                                               u(1)
if( gdr_pic_flag )
    recovery_poc_cnt                                                           ue(v)
for( i = 0; i < NumExtraPhBits; i++ )
    ph_extra_bit[ i ]                                                          u(1)
if( sps_poc_msb_flag ) {
    ph_poc_msb_present_flag                                                    u(1)
    if( ph_poc_msb_present_flag )
        poc_msb_val                                                            u(v)
}
if( sps_alf_enabled_flag && alf_info_in_ph_flag ) {
    ph_alf_enabled_flag                                                        u(1)
    if( ph_alf_enabled_flag ) {
        ph_num_alf_aps_ids_luma                                                u(3)
        for( i = 0; i < ph_num_alf_aps_ids_luma; i++ )
            ph_alf_aps_id_luma[ i ]                                            u(3)
        if( ChromaArrayType != 0 )
            ph_alf_chroma_idc                                                  u(2)
        if( ph_alf_chroma_idc > 0 )
            ph_alf_aps_id_chroma                                               u(3)
        if( sps_ccalf_enabled_flag ) {
            ph_cc_alf_cb_enabled_flag                                          u(1)
            if( ph_cc_alf_cb_enabled_flag )
                ph_cc_alf_cb_aps_id                                            u(3)
            ph_cc_alf_cr_enabled_flag                                          u(1)
            if( ph_cc_alf_cr_enabled_flag )
                ph_cc_alf_cr_aps_id                                            u(3)
        }
    }
}
if( sps_lmcs_enabled_flag ) {
    ph_lmcs_enabled_flag                                                       u(1)
    if( ph_lmcs_enabled_flag ) {
        ph_lmcs_aps_id                                                         u(2)
        if( ChromaArrayType != 0 )
            ph_chroma_residual_scale_flag                                      u(1)
    }
}
if( sps_explicit_scaling_list_enabled_flag ) {
    ph_explicit_scaling_list_enabled_flag                                      u(1)
    if( ph_explicit_scaling_list_enabled_flag )
        ph_scaling_list_aps_id                                                 u(3)
}
if( sps_virtual_boundaries_enabled_flag && !sps_virtual_boundaries_present_flag ) {
    ph_virtual_boundaries_present_flag                                         u(1)
    if( ph_virtual_boundaries_present_flag ) {
        ph_num_ver_virtual_boundaries                                          u(2)
        for( i = 0; i < ph_num_ver_virtual_boundaries; i++ )
            ph_virtual_boundaries_pos_x[ i ]                                   u(13)
        ph_num_hor_virtual_boundaries                                          u(2)
        for( i = 0; i < ph_num_hor_virtual_boundaries; i++ )
            ph_virtual_boundaries_pos_y[ i ]                                   u(13)
    }
}
if( output_flag_present_flag )
    pic_output_flag                                                            u(1)
if( rpl_info_in_ph_flag )
    ref_pic_lists( )
if( partition_constraints_override_enabled_flag )
    partition_constraints_override_flag                                        u(1)
if( ph_intra_slice_allowed_flag ) {
    if( partition_constraints_override_flag ) {
        ph_log2_diff_min_qt_min_cb_intra_slice_luma                            ue(v)
        ph_max_mtt_hierarchy_depth_intra_slice_luma                            ue(v)
        if( ph_max_mtt_hierarchy_depth_intra_slice_luma != 0 ) {
            ph_log2_diff_max_bt_min_qt_intra_slice_luma                        ue(v)
            ph_log2_diff_max_tt_min_qt_intra_slice_luma                        ue(v)
        }
        if( qtbtt_dual_tree_intra_flag ) {
            ph_log2_diff_min_qt_min_cb_intra_slice_chroma                      ue(v)
            ph_max_mtt_hierarchy_depth_intra_slice_chroma                      ue(v)
            if( ph_max_mtt_hierarchy_depth_intra_slice_chroma != 0 ) {
```

TABLE 1-continued

| | |
|---|---|
|           ph_log2_diff_max_bt_min_qt_intra_slice_chroma | ue(v) |
|           ph_log2_diff_max_tt_min_qt_intra_slice_chroma | ue(v) |
|         } | |
|       } | |
|     } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |

TABLE 1-continued

```
if( picture_header_extension_present_flag ) {
  ph_extension_length                                          ue(v)
  for( i = 0; i < ph_extension_length; i++)
    ph_extension_data_byte[ i ]                                u(8)
  }
}
``` ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the Decoded Picture Buffer (DPB) has the same spatial resolution as the current picture, the value of ph_temporal_mvp_enabled_flag shall be equal to 0.

The maximum number of subblock-based merging MVP candidates, MaxNumSubblockMergeCand, is derived as follows:
if (sps_affine_enabled_flag)
  MaxNumSubblockMergeCand=5—five_minus_max_num_subblock_merge_cand (87) else
  MaxNumSubblockMergeCand=sps_sbtmvp_enabled_flag && ph_temporal_mvp_e nabled_flag;
  where the value of MaxNumSubblockMergeCand shall be in the range of 0 to 5, inclusive.
  slice_collocated_from_l0_flag equaling to 1 specifies that the collocated picture used for temporal motion vector prediction is derived from reference picture list 0. slice_collocated_from_l0_flag equalling to 0 specifies that the collocated picture used for temporal motion vector prediction is derived from reference picture list 1.
  When slice_type is equal to B or P, ph_temporal_mvp_enabled_flag is equal to 1, and slice_collocated_from_l0_flag is not present, the following applies:
    If rpl_info_in_ph_flag is equal to 1, slice_collocated_from_l0_flag is inferred to be equal to ph_collocated_from_l0_flag.
    Otherwise (rpl_info_in_ph_flag is equal to 0 and slice_type is equal to P), the value of slice_collocated_from_l0_flag is inferred to be equal to 1.
  slice_collocated_ref_idx specifies the reference index of the collocated picture used for temporal motion vector prediction.
  When slice_type is equal to P or when slice_type is equal to B and slice_collocated_from_l0_flag is equal to 1, slice_collocated_ref_idx refers to an entry in reference picture list 0, and the value of slice_collocated_ref_idx shall be in the range of 0 to NumRefldxActive[0]—1, inclusive.
  When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefldxActive[1]-1, inclusive.
  When slice_collocated_ref_idx is not present, the following applies:
    If rpl_info_in_ph_flag is equal to 1, the value of slice_collocated_ref_idx is inferred to be equal to ph_collocated_ref_idx.

Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag ?0:1] [slice_collocated_ref_idx] shall be equal to 0.

Values of RprConstraintsActive[i]j] is derived in the section 8.3.2 in the VVC specification. The derivation of values of RprConstraintsActive[i]U] is described below.

Decoding Process for Reference Picture Lists Construction

The decoding process for reference picture lists construction is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in video coding standards or in decoding of the slice data.

For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], and the reference picture scaled flags RprConstraintsActive[0][j] and RprConstraintsActive[1][j] are derived as follows:

```
for( i = 0; i < 2; i++ ) {
   for( j = 0, k = 0, pocBase = PicOrderCntVal; j < num_ref_entries[ i ][ RplsIdx[ i ] ]; j++) {
      if( !inter_layer_ref_pic_flag[ i ][ RplsIdx[ i ] ][ j ] ) {
         if( st_ref_pic_flag[ i ][ RplsIdx[ i ] ][ j ] ) {
            RefPicPocList[ i ][ j ] = pocBase − DeltaPocValSt[ i ][ RplsIdx[ i ] ][ j ]
            if( there is a reference picture picA in the DPB with the same nuh_layer_id as the current
picture
                    and PicOrderCntVal equal to RefPicPocList[ i ][ j ] )
               RefPicList[ i ][ j ] = picA
            else
               RefPicList[ i ][ j ] = "no reference picture"                                                    (203)
            pocBase = RefPicPocList[ i ][ j ]
         } else {
            if( !delta_poc_msb_cycle_lt[ i ][ k ] ) {
               if( there is a reference picA in the DPB with the same nuh_layer_id as the current
picture and
                       PicOrderCntVal & ( MaxPicOrderCntLsb − 1 ) equal to PocLsbLt[ i ][ k ] )
                  RefPicList[ i ][ j ] = picA
               else
                  RefPicList[ i ][ j ] = "no reference picture"
               RefPicLtPocList[ i ][ j ] = PocLsbLt[ i ][ k ]
            } else {
               if( there is a reference picA in the DPB with the same nuh_layer_id as the current
picture and
                       PicOrderCntVal equal to FullPocLt[ i ][ k ] )
                  RefPicList[ i ][ j ] = picA
               else
                  RefPicList[ i ][ j ] = "no reference picture"
               RefPicLtPocList[ i ][ j ] = FullPocLt[ i ][ k ]
            }
            k++
         }
      } else {
         layerIdx = DirectRefLayerIdx[ GeneralLayerIdx[ nuh_layer_id ] ][ ilrp_idx[ i ][ RplsIdx ][ j ] ]
         refPicLayerId = vps_layer_id[ layerIdx ]
         if( there is a reference picture picA in the DPB with nuh_layer_id equal to refPicLayerId and
                the same PicOrderCntVal as the current picture )
            RefPicList[ i ][ j ] = picA
         else
            RefPicList[ i ][ j ] = "no reference picture"
      }
      fRefWidth is set equal to PicOutputWidthL of the reference picture RefPicList[ i ][ j ]
      fRefHeight is set equal to PicOutputHeightL of the reference picture RefPicList[ i ][ j ]
      refPicWidth, refPicHeight, refScalingWinLeftOffset, refScalingWinRightOffset,
refScalingWinTopOffset,
            and refScalingWinBottomOffset, are set equal to the values of pic_width_in_luma_samples,
            pic_height_in_luma_samples, scaling_win_left_offset, scaling_win_right_offset,
            scaling_win_top_offset, and scaling_win_bottom_offset, respectively, of the reference picture
            RefPicList[ i ][ j ]
      RefPicScale[ i ][ j ][ 0 ]=( ( fRefWidth << 14 ) + ( PicOutputWidthL >> 1 ) ) / PicOutputWidthL
      RefPicScale[ i ][ j ][ 1 ]=( ( fRefHeight << 14 ) + ( PicOutputHeightL >> 1 ) ) / PicOutputHeightL
      RprConstraintsActive[ i ][ j ] = ( pic_width_in_luma_samples != refPicWidth | |
         pic_height_in_luma_samples != refPicHeight | |
         scaling_win_left_offset != refScalingWinLeftOffset | |
         scaling_win_right_offset != refScalingWinRightOffset | |
         scaling_win_top_offset != refScalingWinTopOffset | |
         scaling_win_bottom_offset != refScalingWinBottomOffset )
   }
}
``` scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC * (scaling_win_left_offset+scaling_win_right_offset) shall be less than pic_width_in_luma_samples, and the value of SubHeightC * (scaling_win_top_offset+scaling_win_bottom_offset) shall be less than pic_height_in_luma_samples.

The variables PicOutputWidthL and PicOutputHeightL are derived as follows: PicOutputWidthL=pic_width_in_luma_samples−

SubWidthC * (scaling_win_right_offset+scaling_win_left_offset)

PicOutputHeightL=pic_height_in_luma_samples−(78)

SubWidthC * (scaling_win_bottom_offset+scaling_win_top_offset).

Let refPicOutputWidthL and refPicOutputHeightL be the PicOutputWidthL and PicOutputHeightL, respectively, of a reference picture of a current picture referring to this PPS. It is a requirement of bitstream conformance that all of the following conditions are satisfied:

PicOutputWidthL * 2 shall be greater than or equal to refPicWidthInLumaSamples.

PicOutputHeightL * 2 shall be greater than or equal to refPicHeightInLumaSamples.

PicOutputWidthL shall be less than or equal to refPicWidthInLumaSamples * 8.

PicOutputHeightL shall be less than or equal to refPicHeightInLumaSamples * 8.

PicOutputWidthL * pic_width_max_in_luma_samples shall be greater than or equal to refPicOutputWidthL * (pic_width_in_luma_samples—Max(8, MinCbSizeY)).

PicOutputHeightL * pic_height_max_in_luma_samples shall be greater than or equal to refPicOutputHeightL * (pic_height_in_luma_samples—Max(8, MinCbSizeY)).

In current VVC, mvd_l1_zero_flag is signaled in the PH without any conditional constraint. However, the feature controlled by the flag mvd_l1_zero_flag is only applicable when the slice is a bi-predictive slice (B-slice). Therefore, the flag signaling is redundant when the slice associated with the picture header is not a B-slice.

In another example, ph_disable_bdof_flag and ph_disable_dmvr_flag are signaled in the PH only when the corresponding enabling flags (sps_bdof_pic_present flag, sps_dmvr_pic_present flag) signaled in sequence parameter set (SPS) are true, respectively. As shown in Table 2 below, however, the features controlled by the flags ph_disable_bdof_flag and ph_disable_dmvr_flag are only applicable when the slice is a bi-predictive slice (B-slice). Therefore, the signaling of these two flags is redundant or useless when the slices associated with the picture header is not a B-slice.

TABLE 2 if( sps_bdof_pic_present_flag )
 ph_disable_bdof_flag
if( sps_dmvr_pic_present_flag )
 ph_disable_dmvr_flag A third problem is associated with the syntax ph_temporal_mvp_enabled_flag. In current VVC, because the resolution of the collocated picture selected for temporal motion vector prediction (TMVP) derivation shall be the same as the resolution of the current picture, there is a bitstream conformance constraint to check the value of ph_temporal_mvp_enabled_flag as described below:
when no reference picture in the DPB has the same spatial resolution as the current picture, the value of ph_temporal_mvp_enabled_flag shall be equal to 0.

However, in current VVC, not only the resolution of the collocated picture will affect the enabling of TMVP, but also the offsets that are applied to the picture size for scaling ratio calculation affect the enabling of TMVP. In current VVC, however, the offsets are not considered in the bitstream conformance of ph_temporal_mvp_enabled_flag.

Moreover, there is a requirement of bitstream conformance that the picture referred to by slice_collocated_ref_idx shall be the same for all slices of a coded picture. But, when a coded picture has multiple slices and there is no common reference picture existing among all these slices, this bitstream conformance has no chance to be met. And in such case, ph_temporal_mvp_enabled_flag should be constrained to be 0.

Several methods are proposed to address the issues described above. It is noted that the proposed methods could be applied independently or combinedly.

Since the features controlled by the flags mvd_l1_zero_flag, ph_disable_bdof_flag and ph_disable_dmvr_flag are only applicable when the slice is a bi-predictive slice (B-slice), according to a method of the disclosure, it is proposed to signal these flags only when the associated slices are B-slices. It is noted that when the reference picture lists are signaled in PH (e.g. rpl_info_in_ph_flag=1), it means all the slices of the coded picture use the same reference pictures signaled in PH. Therefore, when the reference picture lists are signaled in PH and the signaled reference picture lists indicate that the current picture is not bi-predictive, the flags mvd_l1_zero_flag, ph_disable_bdof_flag and ph_disable_dmvr_flag need not to be signaled.

In some examples, some conditions are added to those syntaxes set in PH to prevent redundant signaling or undefined decoding behavior due to improper values sent for some of the syntaxes in the picture header. Some examples are illustrated below, where variables num_ref entries[i][RplsIdx[i]] represent the number of reference pictures in the list i.

If (rpl_info_in_ph_flag && num_ref_entries[ 0 ][ RplsIdx[ 0 ] ] > 1 &&
 num_ref_entries[ 1 ][ RplsIdx[ 1 ] ] > 1 )
  mvd_l1_zero_flag;
If (sps_bdof_pic_present_flag && rpl_info_in_ph_flag &&
 num_ref_entries[ 0 ][ RplsIdx[ 0 ] ] > 1 &&
 num_ref_entries[ 1 ][ RplsIdx[ 1 ] ] > 1 )
  ph_disable_bdof_flag.

In current VVC, not only the resolution of the collocated picture may affect the enabling of TMVP but also the offsets applied to the picture size for scaling ratio calculation may affect the enabling of TMVP. In current VVC, however, the offsets are not considered in the bitstream conformance of ph_temporal_mvp_enabled_flag. In some examples, it is proposed to add a bitstream conformance constraint to the current VVC requiring that the value of ph_temporal_mvp_enabled_flag shall be dependent on the offsets that are applied to the picture size for scaling ratio calculation, as described below:
when no reference picture in the DPB has the same spatial resolution and the same offsets that are applied to the picture size for scaling ratio calculation as the current picture, the value of ph_temporal_mvp_enabled_flag shall be equal to 0.

The above bitstream conformance constraint can also be written in another way as below When no reference picture in the DPB has the associated variable value RprConstraintsActive[i][j] equal to 0, the value of ph_temporal_mvp_enabled_flag shall be equal to 0.

In current VVC, there is a requirement of bitstream conformance that the picture referred to by slice_collocated_ref_idx shall be the same for all slices of a coded picture.

However, when the coded picture has multiple slices and there is no common reference picture existing among all these slices, this bitstream conformance has no chance to be met.

In some exmaples, the requirement of bitstream conformance on ph_temporal_mvp_enabled_flag is modified to consider whether there is a common reference picture existing among all the slices in the current picture.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture existing in all the slices associated with the PH, the value of ph_temporal_mvp_enabled_flag shall be equal to 0.

In some examples, the bitstream conformance on slice_collocated_ref_idx is simplified as that it is a requirement of bitstream conformance that RprConstraintsActive [slice_collocated_from_l0_flag ? 0: 1][slice_collocated_ref_idx]shall be equal to 0.

Figure 5:
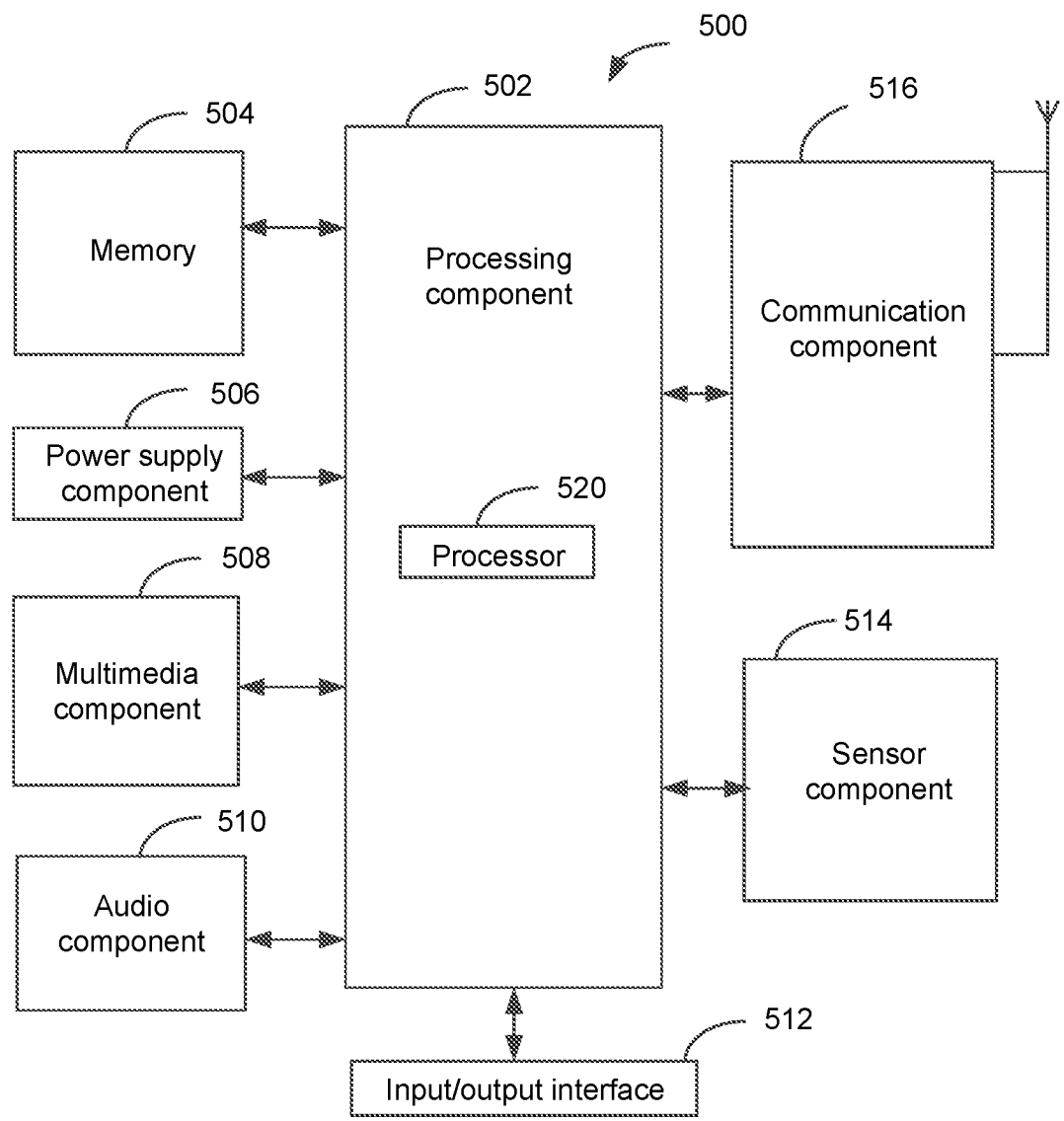
FIG. 5 is a block diagram illustrating an exemplary apparatus for video coding in accordance with some implementations of the present disclosure.

FIG. 5 is a block diagram illustrating an exemplary apparatus for video coding in accordance with some implementations of the present disclosure. The apparatus 500 may be a terminal, such as a mobile phone, a tablet computer, a digital broadcast terminal, a tablet device, or a personal digital assistant.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The sensor component 514 includes one or more sensors for providing a state assessment in different aspects for the apparatus 500. For example, the sensor component 514 may detect an on/off state of the apparatus 500 and relative locations of components. For example, the components are a display and a keypad of the apparatus 500. The sensor component 514 may also detect a position change of the apparatus 500 or a component of the apparatus 500, presence or absence of a contact of a user on the apparatus 500, an orientation or acceleration/deceleration of the apparatus 500, and a temperature change of apparatus 500. The sensor component 514 may include a proximity sensor configured to detect presence of a nearby object without any physical touch. The sensor component 514 may further include an optical sensor, such as a CMOS or CCD image sensor used in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 6 is a flowchart illustrating an exemplary process of video coding in accordance with some implementations of the present disclosure.

In step 602, the processor 520 determines whether one or more reference picture lists are signaled in a PH associated with a picture and whether the one or more reference picture lists indicate that one or more slices associated with the picture are bi-predictive.

In step 604, the processor 620 adds one or more constraints to one or more syntax elements in the PH in response to determining that the one or more reference picture lists are signaled in the PH and the one or more reference picture lists indicate that the one or more slices are not bi-predictive.

In some examples, the one or more constraints comprise skipping parsing the one or more syntax elements.

In some examples, the one or more syntax elements comprise one or more flags applicable for the one or more slices.

The processor 520 may further use an enabled flag, for example, mvd_l1_zero_flag as described above, to specify whether a corresponding motion vector difference (MVD) coding syntax structure is not parsed and whether two variables are set to be zero for the one or more slices associated with the PH, where the two variables respectively specify difference between a list vector component and a prediction corresponding to the list vector component.

In some examples, mvd_l1_zero_flag equaling to 1 indicates that the mvd_coding(x0, y0, 1) syntax structure is not parsed and MvdL1[x0][y0][compIdx] and MvdCpL1[x0][y0][cpIdx][compIdx] are set equaling to 0 for compIdx=0 or 1 and cpIdx=0, 1, or 2. Further, mvd_l1_zero_flag equaling to 0 indicates that the mvd_coding(x0, y0, 1) syntax structure is parsed. The mvd_coding(x0, y0, 1) syntax structure is a corresponding MVD coding syntax structure. The array indices x0, y0 specify the location (x0, y0) of the top-left luma sample of the considered coding block relative to the top-left luma sample of the picture.

Further, the variable MvdLX[x0][y0][compIdx], with X being 0 or 1, specifies the difference between a list X vector component to be used and its prediction. The array indices x0, y$^0$ specify the location (x0, y0) of the top-left luma sample of the considered coding block relative to the top-left luma sample of the picture. The horizontal motion vector component difference is assigned compIdx=0 and the vertical motion vector component is assigned compIdx=1.

Moreover, the variable MvdCpLX[x0][y0][cpIdx][compIdx], with X being 0 or 1, specifies the difference between a list X vector component to be used and its prediction. The array indices x0, y$^0$ specify the location (x0, y0) of the top-left luma sample of the considered coding block relative to the top-left luma sample of the picture. The array index cpIdx specifies the control point index. The horizontal motion vector component difference is assigned compIdx=0 and the vertical motion vector component is assigned compIdx=1.

The processor 520 may further constrain the one or more syntax elements such that the MVD coding syntax structure is parsed for the one or more slices in response to determining that the enabled flag equaling to 0.

The processor 520 may further determines to skip parsing the MVD syntax structure in decoding the one or more slices in response to determining that the enabled flag equaling to 1.

The processor 520 may further use a disabled flag, for example, ph_disable_bdof_flag described above, to specify whether bi-directional optical flow (BDOF) inter prediction based inter bi-prediction is disabled for the one or more slices associated with the PH; constrain, in response to determining that the disabled flag equaling to 0, the one or more syntax elements such that the BDOF inter prediction based inter bi-prediction is enabled in decoding the one or more slices; and disable the BDOF inter prediction based inter bi-prediction in decoding the one or more slices in response to determining that the disabled flag equaling to 1.

The processor 520 may further use a disabled flag, for example, ph_disable_dmvr_flag described above, to specify whether decoder motion vector refinement (DMVR) based inter bi-prediction is disabled for the one or more slices associated with the PH; constrain, in response to determining that the disabled flag equaling to 0, the one or more syntax elements such that the DMVR based inter bi-prediction is enabled in decoding the one or more slices; and disable, in response to determining that the disabled flag equaling to 1, the DMVR based inter bi-prediction in decoding the one or more slices.

FIG. 7 is a flowchart illustrating an exemplary process of video coding in accordance with some implementations of the present disclosure.

In step 702, the processor 520 using an enabled flag to specify whether one or more temporal motion vector predictors used for inter prediction for one or more slices associated with a PH of a picture.

In step 704, the processor 520 constrain value of the enabled flag according to a plurality of offsets applied to a size of the picture for scaling ratio calculation.

The processor 520 may set the enabled flag to 0 in response to determining that there is no reference picture in a DPB having a same spatial resolution and same offsets as the picture. Further, the offsets may be applied to the size of the picture for scaling ratio calculation.

The processor 520 may set the enabled flag to 0 in response to determining that there is no common inference picture in the one or more slices.

The processor 520 may set the enabled flag to 0 in response to determining that there is no reference picture in a DPB having a reference picture scaled flag equaling to 0.

The processor 520 may derive the reference picture scaled flag based on the plurality of offsets applied to the size of the picture for scaling ratio calculation.

In some examples, there is provided an apparatus for video coding. The apparatus includes one or more processors 520; and a memory 504 configured to store instructions executable by the one or more processors; where the processor, upon execution of the instructions, is configured to perform a method as illustrated in FIG. 6.

In some examples, there is provided an apparatus for video coding. The apparatus includes one or more processors 520; and a memory 504 configured to store instructions executable by the one or more processors; where the processor, upon execution of the instructions, is configured to perform a method as illustrated in FIG. 7.

In some other examples, there is provided a non-transitory computer readable storage medium 504, having instructions stored therein. When the instructions are executed by one or more processors 520, the instructions cause the processor to perform a method as illustrated in FIG. 6.

In some other examples, there is provided a non-transitory computer readable storage medium 504, having instructions stored therein. When the instructions are executed by one or more processors 520, the instructions cause the processor to perform a method as illustrated in FIG. 7.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
determining, by a decoder, whether information of one or more reference picture lists is signaled in a picture header (PH) associated with a picture, and determining from the information of the one or more reference picture lists whether one or more slices associated with the picture are bi-predictive in response to determining that the information of the one or more reference picture lists is signaled in the PH; and
in response to determining that the information of the one or more reference picture lists is signaled in the PH and determining from the information of the one or more reference picture lists that the one or more slices are not bi-predictive, not parsing, by the decoder, one or more syntax elements in the PH.

2. The method according to claim 1, wherein the one or more syntax elements comprise one or more flags applicable for the one or more slices.

3. The method according to claim 1, further comprising:
in response to determining that the information of the one or more reference picture lists is signaled in the PH and determining from the information of the one or more reference picture lists that the one or more slices are bi-predictive, obtaining the one or more syntax elements to specify whether a corresponding motion vector difference (MVD) coding syntax structure is not parsed and whether two variables are set to be zero for the one or more slices associated with the PH, wherein the two variables respectively specify a difference between a list vector component and a prediction corresponding to the list vector component;
in response to determining that the one or more syntax elements equal to 0, parsing the MVD coding syntax structure for the one or more slices; and
in response to determining that the one or more syntax elements equal to 1, not parsing the MVD coding syntax structure to decode the one or more slices.

4. The method according to claim 1, further comprising:
in response to determining that the information of the one or more reference picture lists is signaled in the PH and determining from the information of the one or more reference picture lists that the one or more slices are bi-predictive, obtaining the one or more syntax elements to specify whether bi-directional optical flow (BDOF) inter prediction based inter bi-prediction is disabled for the one or more slices associated with the PH;
in response to determining that the one or more syntax elements equal to 0, enabling the BDOF inter prediction based inter bi-prediction to decode the one or more slices; and in response to determining that the one or more syntax elements equal to 1, disabling the BDOF inter prediction based inter bi-prediction to decode the one or more slices.

5. The method according to claim 1, further comprising:
in response to determining that the information of the one or more reference picture lists is signaled in the PH and determining from the information of the one or more reference picture lists that the one or more slices are bi-predictive, obtaining the one or more syntax elements to specify whether decoder motion vector refinement (DMVR) based inter bi-prediction is disabled for the one or more slices associated with the PH;
in response to determining that the one or more syntax elements equal to 0, enabling the DMVR based inter bi-prediction to decode the one or more slices; and
in response to determining that the one or more syntax elements equal to 1, disabling the DMVR based inter bi-prediction to decode the one or more slices.

6. An apparatus for video decoding, comprising:
one or more processors; and
a memory configured to store instructions executable by the one or more processors; wherein the one or more processors, upon execution of the instructions, are configured to:
determine whether information of one or more reference picture lists is signaled in a picture header (PH) associated with a picture, and determine from the information of the one or more reference picture lists whether one or more slices associated with the picture are bi-predictive in response to determining that the information of the one or more reference picture lists is signaled in the PH; and
in response to determining that the information of the one or more reference picture lists is signaled in the PH and determining from the information of the one or more reference picture lists that the one or more slices are not bi-predictive, not parse one or more syntax elements in the PH.

7. The apparatus according to claim 6, wherein the one or more syntax elements comprise one or more flags applicable for the one or more slices.

8. The apparatus according to claim 6, wherein the one or more processors are further configured to:
in response to determining that the information of the one or more reference picture lists is signaled in the PH and determining from the information of the one or more reference picture lists that the one or more slices are bi-predictive, obtain the one or more syntax elements to specify whether a corresponding motion vector difference (MVD) coding syntax structure is not parsed and whether two variables are set to be zero for the one or more slices associated with the PH, wherein the two variables respectively specify a difference between a list vector component and a prediction corresponding to the list vector component;
in response to determining that the one or more syntax elements equal to 0, parse the MVD coding syntax structure for the one or more slices; and
in response to determining that the one or more syntax elements equal to 1, not parse the MVD coding syntax structure to decode the one or more slices.

9. The apparatus according to claim 6, wherein the one or more processors are further configured to:
in response to determining that the information of the one or more reference picture lists is signaled in the PH and determining from the information of the one or more reference picture lists that the one or more slices are bi-predictive, obtain the one or more syntax elements to specify whether bi-directional optical flow (BDOF) inter prediction based inter bi-prediction is disabled for the one or more slices associated with the PH;

in response to determining that the one or more syntax elements equal to 0, enable the BDOF inter prediction based inter bi-prediction to decode the one or more slices; and in response to determining that the one or more syntax elements equal to 1, disable the BDOF inter prediction based inter bi-prediction to decode the one or more slices.

10. The apparatus according to claim 6, wherein the one or more processors are further configured to:

in response to determining that the information of the one or more reference picture lists is signaled in the PH and determining from the information of the one or more reference picture lists that the one or more slices are bi-predictive, obtain the one or more syntax elements to specify whether decoder motion vector refinement (DMVR) based inter bi-prediction is disabled for the one or more slices associated with the PH;

in response to determining that the one or more syntax elements equal to 0, enable the DMVR based inter bi-prediction to decode the one or more slices; and in response to determining that the one or more syntax elements equal to 1, disable the DMVR based inter bi-prediction to decode the one or more slices.

11. A non-transitory computer-readable storage medium for video decoding storing a bitstream to be decoded by a method for video decoding comprising:

determining whether information of one or more reference picture lists is signaled in a picture header (PH) associated with a picture, and determining from the information of the one or more reference picture lists whether one or more slices associated with the picture are bi-predictive in response to determining that the information of the one or more reference picture lists is signaled in the PH; and in response to determining that the information of the one or more reference picture lists is signaled in the PH and determining from the information of the one or more reference picture lists that the one or more slices are not bi-predictive, not parsing one or more syntax elements in the PH.

12. The non-transitory computer-readable storage medium according to claim 11, wherein the one or more syntax elements comprise one or more flags applicable for the one or more slices.

13. The non-transitory computer-readable storage medium according to claim 11, wherein the method further comprises:

in response to determining that the information of the one or more reference picture lists is signaled in the PH and determining from the information of the one or more reference picture lists that the one or more slices are bi-predictive, obtaining the one or more syntax elements to specify whether a corresponding motion vector difference (MVD) coding syntax structure is not parsed and whether two variables are set to be zero for the one or more slices associated with the PH, wherein the two variables respectively specify a difference between a list vector component and a prediction corresponding to the list vector component;

in response to determining that the one or more syntax elements equal to 0, parsing the MVD coding syntax structure for the one or more slices; and in response to determining that the one or more syntax elements equal to 1, not parsing the MVD coding syntax structure to decode the one or more slices.

14. The non-transitory computer-readable storage medium according to claim 11, wherein the method further comprises:

in response to determining that the information of the one or more reference picture lists is signaled in the PH and determining from the information of the one or more reference picture lists that the one or more slices are bi-predictive, obtaining the one or more syntax elements to specify whether bi-directional optical flow (BDOF) inter prediction based inter bi-prediction is disabled for the one or more slices associated with the PH;

in response to determining that the one or more syntax elements equal to 0, enabling the BDOF inter prediction based inter bi-prediction to decode the one or more slices; and in response to determining that the one or more syntax elements equal to 1, disabling the BDOF inter prediction based inter bi-prediction to decode the one or more slices.

15. The non-transitory computer-readable storage medium according to claim 11, wherein the method further comprises:

in response to determining that the information of the one or more reference picture lists is signaled in the PH and determining from the information of the one or more reference picture lists that the one or more slices are bi-predictive, obtaining the one or more syntax elements to specify whether decoder motion vector refinement (DMVR) based inter bi-prediction is disabled for the one or more slices associated with the PH;

in response to determining that the one or more syntax elements equal to 0, enabling the DMVR based inter bi-prediction to decode the one or more slices; and in response to determining that the one or more syntax elements equal to 1, disabling the DMVR based inter bi-prediction to decode the one or more slices.

* * * * *